United States Patent
Sugizaki et al.

(10) Patent No.: US 7,126,748 B2
(45) Date of Patent: Oct. 24, 2006

(54) OPTICAL FIBER, OPTICAL FIBER MODULE, AND RAMAN AMPLIFIER

(75) Inventors: Ryuichi Sugizaki, Tokyo (JP); Yuki Taniguchi, Tokyo (JP); Takeshi Yagi, Toyko (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 118 days.

(21) Appl. No.: 10/871,052

(22) Filed: Jun. 21, 2004

(65) Prior Publication Data

US 2005/0024711 A1    Feb. 3, 2005

Related U.S. Application Data

(60) Provisional application No. 60/479,463, filed on Jun. 19, 2003.

(30) Foreign Application Priority Data

Jun. 2, 2004    (JP) ............... 2004-164886

(51) Int. Cl.
  *H01S 4/00* (2006.01)
  *H04B 10/12* (2006.01)
(52) U.S. Cl. .................. 359/334; 385/122; 385/124
(58) Field of Classification Search ............... 359/334; 385/122, 124

See application file for complete search history.

(56) References Cited

U.S. PATENT DOCUMENTS

| 4,804,248 | A * | 2/1989 | Bhagavatula | 385/28 |
|---|---|---|---|---|
| 6,542,677 | B1 * | 4/2003 | Okuno | 385/123 |
| 6,661,958 | B1 | 12/2003 | Hirano et al. | |
| 2001/0021298 | A1 * | 9/2001 | Mukasa | 385/124 |
| 2002/0001444 | A1 * | 1/2002 | Hirano et al. | 385/123 |
| 2002/0051611 | A1 * | 5/2002 | Mukasa | 385/123 |
| 2002/0057880 | A1 * | 5/2002 | Hirano et al. | 385/127 |
| 2002/0135866 | A1 * | 9/2002 | Sasaoka et al. | 359/334 |
| 2002/0181076 | A1 * | 12/2002 | Bickham et al. | 359/334 |

FOREIGN PATENT DOCUMENTS

JP    2002-207136    7/2002

* cited by examiner

*Primary Examiner*—Deandra M. Hughes
*Assistant Examiner*—Eric Bolda
(74) *Attorney, Agent, or Firm*—Oblon, Spivak, McClelland, Maier & Neustadt, P.C.

(57) ABSTRACT

An optical fiber has a Raman gain efficiency with a pump power at 1450 nanometers of equal to or more than 4 m/W, and a ratio of a nonlinear parameter γ at a wavelength of 1550 nanometers to the Raman gain efficiency with a pump power of 1450 nanometers is equal to or less than 3.

21 Claims, 6 Drawing Sheets

FIG.3

| | Δ1 | Δ2 | a/b | b | TRANS-MISSION LOSS 1550 nm | λc | GR/Aeff 1450 nm pump | γ 1550 nm | Aeff 1550 nm | Aeff 1450 nm | Aeff 1550/1450 nm | γ/[GR/Aeff] |
|---|---|---|---|---|---|---|---|---|---|---|---|---|
| | % | % | - | μm | dB/km | nm | (m/W) | (1/W/km) | μm² | μm² | --- | (1/W/km)/(m/W) |
| A | 2.4 | -0.55 | 0.80 | 3.4 | 0.52 | 854 | 4.7 | 13.8 | 13.2 | 10.3 | 1.28 | 2.94 |
| B | 2.4 | -0.55 | 0.40 | 6.2 | 0.54 | 741 | 4.8 | 13.3 | 13.7 | 9.4 | 1.46 | 2.77 |
| C | 2.4 | -0.55 | 0.90 | 3 | 0.52 | 870 | 4.6 | 13.6 | 13.4 | 10.6 | 1.26 | 2.96 |
| D | 2.8 | -0.25 | 0.45 | 6.1 | 0.82 | 1010 | 6.5 | 19.1 | 11.1 | 8.9 | 1.25 | 2.94 |
| E | 2.8 | -0.55 | 0.32 | 7.8 | 0.81 | 810 | 7.5 | 24.8 | 9.1 | 7.79 | 1.17 | 3.31 |
| F | 2.8 | -0.55 | 0.48 | 4.8 | 0.79 | 813 | 6.0 | 21.0 | 10.8 | 9.20 | 1.17 | 3.50 |

FIG.8

| | Δ1 | Δ2 | Δ3 | a/b | c/b | b | TRANS-MISSION LOSS 1550 nm | λc | GR/Aeff 1450 nm pump | γ 1550 nm | Aeff 1550 nm | Aeff 1450 nm | Aeff 1550/1450 nm | γ/[GR/Aeff] |
|---|---|---|---|---|---|---|---|---|---|---|---|---|---|---|
| | % | % | % | - | - | μm | dB/km | nm | (m/W) | (1/W/km) | μm² | μm² | --- | (1/W/km)/(m/W) |
| G | 2.8 | -1.0 | 0.4 | 0.50 | 1.5 | 6.3 | 0.82 | 1041 | 7.2 | 21.6 | 9.83 | 8.15 | 1.21 | 3.00 |
| H | 2.8 | -0.55 | 0.2 | 0.75 | 2.0 | 5.3 | 0.79 | 1280 | 6.4 | 19.1 | 11.1 | 9.17 | 1.21 | 2.98 |
| I | 2.4 | -0.7 | 0.2 | 0.7 | 1.8 | 5.0 | 0.52 | 970 | 4.5 | 13.5 | 13.5 | 11.1 | 1.22 | 3.00 |

# OPTICAL FIBER, OPTICAL FIBER MODULE, AND RAMAN AMPLIFIER

CROSS-REFERENCE TO RELATED APPLICATIONS

The present document incorporates by reference the entire contents of U.S. provisional application document, 60/479,463 filed in the U.S. on Jun. 19, 2003 and Japanese priority document 2004-164886 filed in Japan on Jun. 2, 2004.

BACKGROUND OF THE INVENTION

1) Field of the Invention

The present invention relates to an optical fiber, an optical fiber module, and a Raman amplifier for high-speed optical communications.

2) Description of the Related Art

Raman amplifiers are receiving more attention as an amplifier capable of light amplification in a desired wavelength band and realizing a gain over a bandwidth as broad as 100 nanometers. Any silica-based optical fiber can be employed as an optical fiber used as an amplifying medium of the Raman amplifier. However, as a Discrete Raman amplifier, an optical fiber with Raman gain efficiency (GR/Aeff, where GR is Raman gain coefficient and Aeff is effective area) of 6.5 m/W or more is generally used, and a gain of 20 decibels or more is obtained with a pump light of about 500 milliwatts.

Although the conventional optical fiber achieves the gain of 20 decibels or more with the pump light of about 500 milliwatts, it is accompanied by a large nonlinear phase shift simultaneously, and as a result, communication quality is deteriorated due to a waveform distortion of a signal light, which is an adverse factor that hinders high-speed optical communications.

The nonlinear phase shift of a signal light in an optical fiber with a length L is expressed by $$\Delta\Phi_{NL}(L) = \frac{2\pi n_2}{\lambda_S A_{eff}} \int_0^L P_S(z) dz$$

where Ps is a power of the signal light, $\lambda_s$ is a wavelength of the signal light, $n_2$ is a nonlinear refractive index of the optical fiber, and $(2\pi/\lambda)\cdot(n_2/\text{Aeff})$ is a nonlinear parameter $\gamma$ of the optical fiber. The above equation tells that, as the nonlinear parameter $\gamma$ of the optical fiber becomes larger, the nonlinear phase shift of a signal light becomes larger and the nonlinear optical phenomenon such as a self phase modulation or a cross phase modulation becomes easier to occur. Since the nonlinear parameter $\gamma$ is proportional to the Raman gain efficiency, if the Raman gain efficiency of a high nonlinear optical fiber is increased in order to increase the efficiency of the Raman amplifier, the nonlinear parameter $\gamma$ is also increased, so that a large nonlinear phase shift occurs.

In other words, a nonlinear phase shaft is more likely to occur as an Aeff or a mode field diameter is small, and a germanium concentration in a center core of the optical fiber is high. Since an optical fiber with a large Raman gain is generally has a large nonlinear refractive index $n_2$, a large nonlinear phase shift is caused at the same time.

SUMMARY OF THE INVENTION

It is an object of the present invention to solve at least the above problems in the conventional technology.

The optical fiber according to one aspect of the present invention has Raman gain efficiency with a pump power at 1450 nanometers of equal to or more than 4 m/W, and has a ratio of a nonlinear parameter $\gamma$ at a wavelength of 1550 nanometers to the Raman gain efficiency with a pump power of 1450 nanometers of equal to or less than 3.

The optical fiber module according to another aspect of the present invention includes an optical fiber having a Raman gain efficiency with a pump power at 1450 nanometers of equal to or more than 4 m/W, and a ratio of a nonlinear parameter $\gamma$ at a wavelength of 1550 nanometers to the Raman gain efficiency with a pump power of 1450 nanometers of equal to or less than 3.

The Raman amplifier according to still another aspect of the present invention inputs a pump light into an optical fiber to conduct Raman amplification of a signal light. The optical fiber has a Raman gain efficiency with a pump power at 1450 nanometers of equal to or more than 4 m/W, and a ratio of a nonlinear parameter $\gamma$ at a wavelength of 1550 nanometers to the Raman gain efficiency with a pump power of 1450 nanometers of equal to or less than 3.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a table for comparing characteristics of an example of the amplification fiber used in the Raman amplifier shown in FIG. 1 and a conventional amplification fiber;

FIG. 8 is a table of characteristics of the amplification fiber shown in FIG. 7.

DETAILED DESCRIPTION

Figure 1:
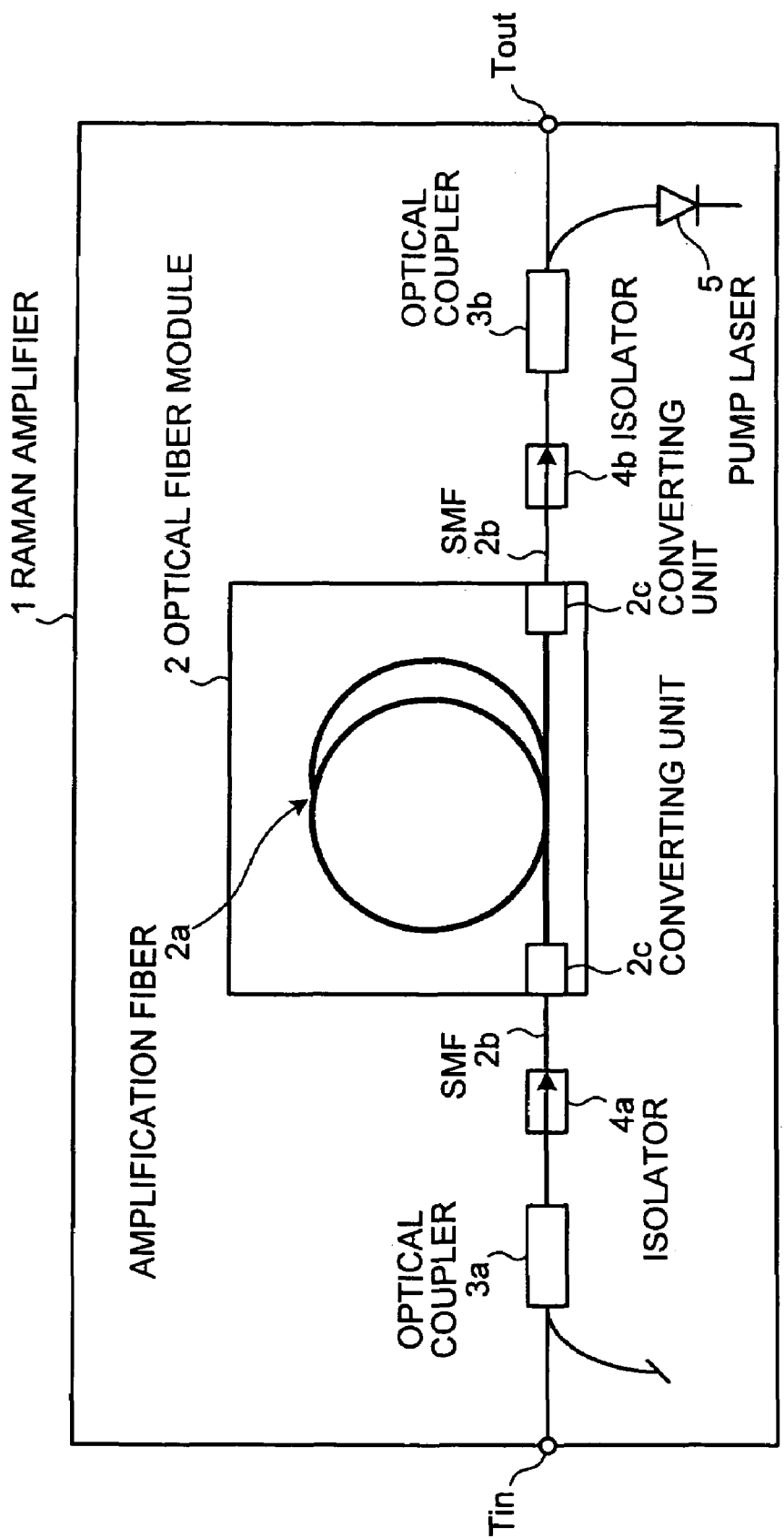
FIG. 1 is a block diagram of a Raman amplifier according to an embodiment of the present invention.

Exemplary embodiments of an optical fiber, an optical fiber module, and a Raman amplifier according to the present invention are described below with reference to the accompanying drawings. FIG. 1 is a block diagram of a Raman amplifier according to an embodiment of the present invention. The Raman amplifier 1 is a Discrete Raman amplifier, provided with an optical fiber module 2. An input terminal Tin, to which a signal light is input, is connected to the optical fiber module 2 via an optical coupler 3a and an isolator 4a. The optical fiber module 2 is connected to an output terminal Tout, from which an amplified signal light is output via an isolator 4b and an optical coupler 3b. The optical coupler 3b is connected to a pump laser 5, and a pump light from the pump laser 5 is outputted toward the optical fiber module 2.

The optical fiber module 2 has an amplification fiber 2a wound on a bobbin, and has converting units 2c, each of which performs mode field diameter conversion between the optical fiber 2b of a single mode fiber corresponding to each of the isolators 4a, 4b, and the amplification fiber 2a. The mode field diameter of the single mode optical fiber is about 10 micrometers, and the mode field diameter of the amplification fiber 2a is about 4 micrometers.

A signal light input to the input terminal Tin is guided into the amplification fiber 2a inside the optical fiber module 2 via the optical coupler 3a and the isolator 4a. The amplification fiber 2a is put in an amplification enabling state by a pump light inputted from the pump laser 5, thereby amplifying the inputted signal light to output the same from the output terminal Tout via the isolator 4b and the optical coupler 3b.

Figure 2:
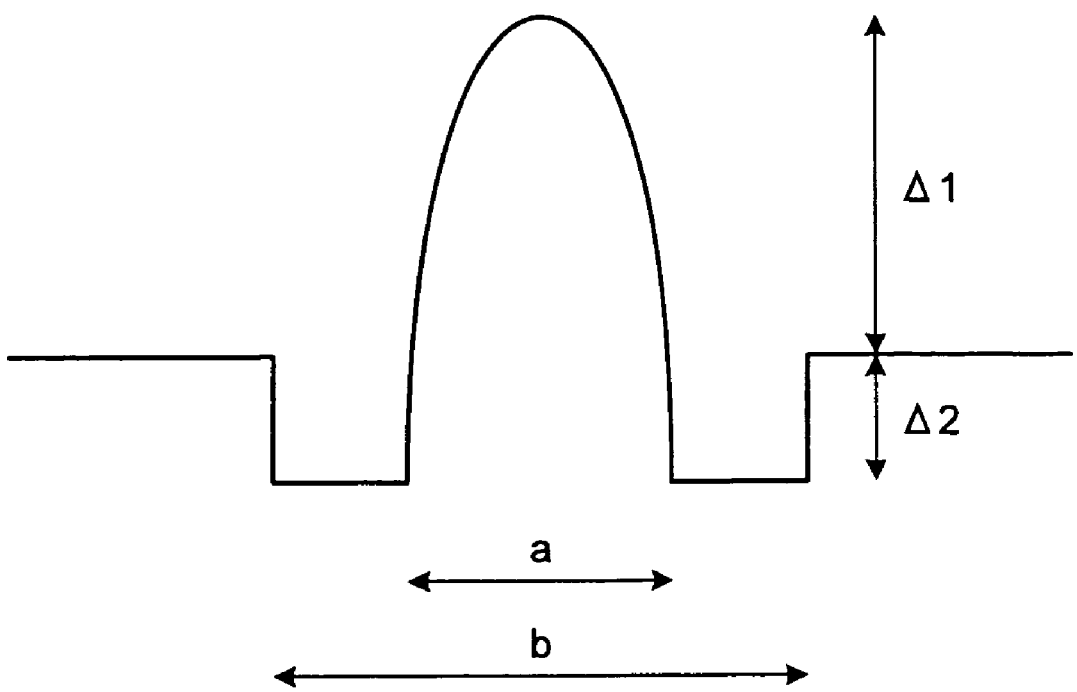
FIG. 2 is a diagram of a refractive index profile of an amplification fiber used in the Raman amplifier shown in FIG. 1.

FIG. 2 is a diagram of a refractive index profile of an amplification fiber 2a. The amplification fiber 2a has a W-shaped profile, it has a first core region of an α-shaped profile at a center in which refractive index is higher than a cladding and a second core region surrounding the first core region in which refractive index is lower than the cladding. The diameter of the first core is defined as "a" and the diameter of the second core region is defined as "b". A relative refractive index difference of the first core region with a cladding region is defined as "Δ1" and a relative refractive index difference of the second core region with the cladding region is defined as "Δ2". In general, the cladding region is substantially made of pure silica glass, however it may be also doped with fluorine.

FIG. 3 is a table of characteristics of various amplification fibers 2a, where "A" to "D" indicate amplification fibers according to the present embodiment, and "E" and "F" indicate conventional amplification fibers for comparison. Relative refractive index differences Δ1, Δ2, a ratio a/b of first core diameter "a" to second core diameter "b", a transmission loss at the wavelength of 1550 nanometers, a cut-off wavelength λc, a Raman amplification efficiency, a nonlinear parameter γ, an effective area Aeff at 1550 nanometers (signal light), 1450 nanometers (pump light), a ratio of the effective area at the wavelength of 1550 nanometers to the effective area at the wavelength of 1450 nanometers, and a ratio of a nonlinear parameter γ at a wavelength of 1550 nanometers to the Raman gain efficiency with a pump power of 1450 nanometers are shown regarding the amplification fibers "A" to "F".

The cut-off wavelength λc is the fiber cut-off wavelength defined by ITU-T G.650.1. Other terms that are not defined in this specification are subjected to definitions and measurement methods described in the ITU-T G.650.1 or the ITU-T G.650.2.

Furthermore, a cladding of the optical fibers described in this specification is substantially made of the silica glass.

The amplification fibers "A" to "D" according to the present embodiment are respectively set such that the Raman gains are equal to or more than 4 (m/W) and their ratios of the nonlinear parameter γ to Raman gain efficiency are equal to or less than 3. Further, these fibers are set such that their ratios of the effective area Aeff at the wavelength of 1550 nanometers to the effective area Aeff at the wavelength of 1450 nanometers are equal to or more than 1.2. In addition, the optical fiber "D" is set such that its effective area Aeff at the wavelength of 1450 nanometers is equal to or less than 9.0 μm$^2$ and its effective area Aeff at the wavelength of 1550 nanometers is equal to or more than 11.0 μm$^2$. The effective area Aeff at the wavelength of 1450 nanometers is equal to or less than 9.0 μm$^2$ and the effective area Aeff at the wavelength of 1550 nanometers is equal to or more than 11.0 μm$^2$ is desirable to obtain the large Raman gains suppressing the nonlinear parameter γ.

Although the Raman gain efficiency of the conventional amplification fiber "E" is larger than the Raman gain efficiencies of the amplification fibers "A" to "D", the value of the nonlinear parameter γ of the amplification fiber "E" is large correspondingly, and a nonlinear phase shift becomes more likely to occur. On the other hand, although the amplification fibers "A" to "D" suppress the Raman gain efficiencies, the nonlinear parameters are small, and occurrence of a nonlinear phase shift is suppressed.

The amplification fiber "D" is applied for the Raman amplifier shown in FIG. 1 as an amplification fiber 2a. When a pump light of 500 milliwatts with a wavelength of 1450 nanometers is incident on the amplification fiber "D", a Raman amplifier which can obtain a net gain of about 20 decibels is realized. By suppressing the connection loss due to the converting unit 2c to 0.1 decibel, the characteristics of the whole Raman amplifier 1 can be improved.

The net gain of 20 decibels obtained by the Raman amplifier 1 using the amplification fiber "D" is a gain sufficient for compensating for loss of an ordinary transmission path of 80 kilometers. On the other hand, in case of a Raman amplifier using the conventional amplification fiber "E", a sufficient gain can be confirmed with a pump light of 440 milliwatts but a nonlinear strain of signal light is large. A nonlinear strain occurring when the amplification fiber "D" is used is reduced by 15% as compared with a nonlinear strain occurring when the amplification fiber "E" is used. This is achieved owing to such an effect that the nonlinear parameter γ can be reduced while a sufficient Raman gain efficiency is maintained. The nonlinear parameter γ depends on the effective area Aeff of a signal band, but the Raman gain efficiency comes from an interaction between the effective area Aeff of the signal band and the effective area Aeff of the pump band. That is, the reason why the effect can be obtained is because the ratio of the effective area Aeff of the signal band to the effective area Aeff of the pump band is set equal to or more than 1.2.

The amplification fibers "A" to "C" require high power pumping of 700 milliwatts in order to obtain the net gain of 20 decibels without the Raman gain efficiency reaching 6.5. However, the amount of nonlinear phase shift of each of the amplification fibers "A" to "C" is equal to that of the amplification fiber "D", and the amplification fibers "A" to "C" become sufficiently realistic if an inexpensive high power laser is realized. On the other hand, in the conventional amplification fiber "F", since its original nonlinear parameter γ is large, the nonlinear phase shift is large, even if a high power pumping is conducted, which results in difficulty in use.

The concept of these embodiments is summarized below. First, the nonlinear phase shift is determined according to the nonlinear refractive index $n_2$ of the signal band and the effective area Aeff, but the Raman gain is determined the Raman gain efficiency. The output of the pump light can be increased by improving the pump laser. However, a pump light exceeding 1 watt causes a problem about safety and cannot be used for applications of distributed Raman amplification. In a discrete Raman amplification, since pump light does not leak to the outside of the module of the Raman amplifier 1, the output of the pump light will not be so problematic. However, it is considered that such a high power pump laser that cannot be applied in the distributed Raman amplification is one for a special application, and therefore, cost reduction in manufacture cannot be expected at present. Therefore, it is desired that such a Raman gain efficiency that a sufficient gain can be obtained with a pump light of about 800 milliwatts is achieved in the amplification fiber 2a of the discrete Raman amplifier 1. In order to constitute a discrete Raman amplifier which can obtain a gain of 20 decibels, it is essential to achieve the Raman gain efficiency of 4 (m/W).

Both the nonlinear phase shift and the Raman gain efficiency are parameters regarding the nonlinear phenomenon. In general, when the Raman gain efficiency is increased, the nonlinear phase shift is also increased. In the conventional optical fiber, the nonlinear parameter γ becomes three times or more in order to obtain the Raman gain efficiency of 4 (m/W).

In order to avoid such a problem, as described above, such means is employed that a difference between the effective area Aeff between the wavelength of 1450 nanometers and the wavelength of 1550 nanometers are made large. The conventional amplification fiber for Raman amplification is aimed to reduce the difference in effective area Aeff between the wavelength of 1450 nanometers and the wavelength of 1550 nanometers to transfer the power of 1450 nanometers to that of 1550 nanometers effectively.

In case that the power of 1450 nanometers is transferred to that of 1550 nanometers, when the values of the effective area Aeff of the pump light at the wavelength of 1450 nanometers and the signal light at the wavelength of 1550 nanometers are close to each other, energies of lights with respective wavelengths become more likely to be influenced by each other. That is, the improvement of the Raman gain is aimed by reducing the values of the respective effective area Aeff at the wavelengths of 1450 nanometers and 1550 nanometers and decreasing a difference between the both.

When the effective area Aeff of the signal band is small, however, the Raman gain becomes large, but the nonlinear parameter γ also becomes large eventually. It is advantageous to make the effective area Aeff of the signal band large. Therefore, when the effective area Aeff of the pump band is reduced while the effective area Aeff of the signal band is expanded, at least power of the pump band can be concentrated while the nonlinear phase shift on the signal band is avoided, so that the Raman gain can be maintained.

Figure 7:
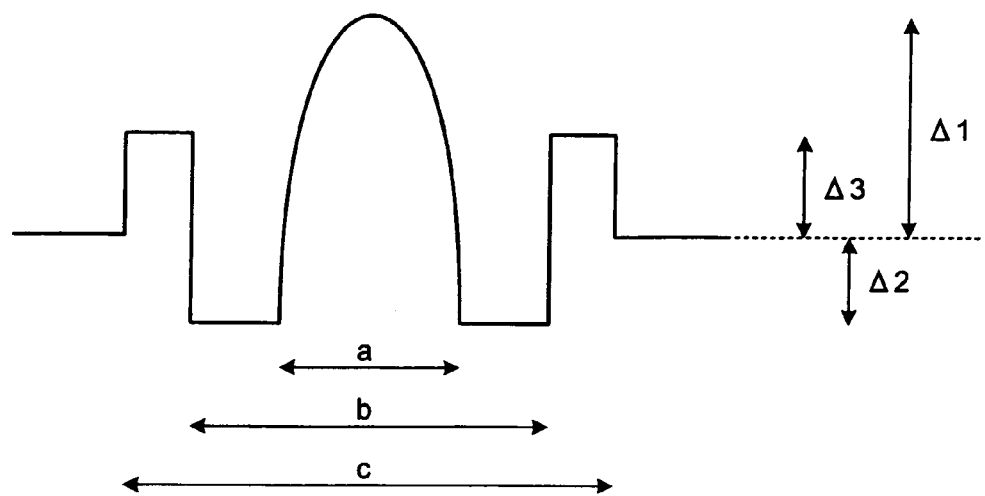
FIG. 7 is a diagram of another refractive index profile of the amplification fiber used in the Raman amplifier shown in FIG. 1.

FIG. 7 is a diagram of an example of the amplification fiber having a refractive index profile different from that shown in FIG. 2. This amplification fiber 2a has a W-segment profile, it has a first core region of an α-shaped profile at a center in which refractive index is higher than a cladding, a second core region surrounding the first core region in which refractive index is lower than the cladding and a third core region surrounding the second core region in which refractive index is lower than the first core region and higher than the cladding. The diameter of the first core is defined as "a", the diameter of the second core region is defined as "b" and the diameter of the third core region is defined as "c". A relative refractive index difference of the first core region with a cladding region is defined as "Δ1", a relative refractive index difference of the second core region with the cladding region is defined as "Δ2" and a relative refractive index difference of the third core region with the cladding region is defined as "Δ3". In general, the cladding region is substantially made of pure silica glass, it may be also doped with fluorine.

Figure 4:
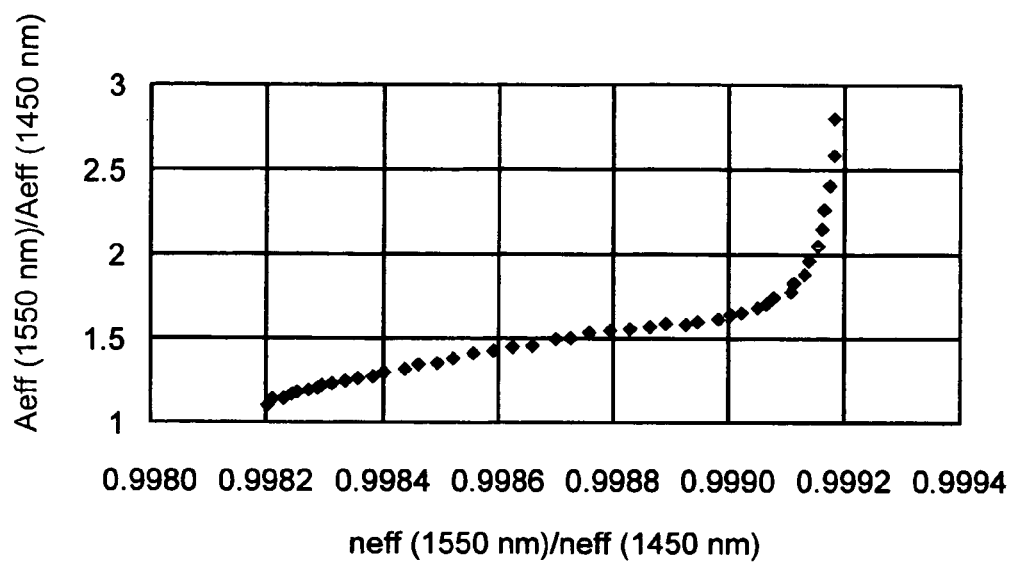
FIG. 4 is a graph of a relationship between a ratio of propagation refractive index (neff) at 1550 nm to propagation refractive index at 1450 nm and a ratio of effective areas at 1550 nm to propagation refractive index at 1450 nm.

FIG. 4 shows a relationship between a ratio of propagation refractive index of the 1550 nanometers to 1450 nanometers and a ratio of effective areas of the 1550 nanometers to 1450 nanometers of the amplification fiber of W-segment profile as shown in FIG. 7 under the conditions of Δ1=2.8%, Δ2=0.25%, Δ3=0.4%, a/b=0.45, and c/b=1.3.

As shown in FIG. 4, it is understood that the ratio of the respective effective areas Aeff of 1450 nanometers and 1550 nanometers of the amplification optical fiber is 1.1 at the lower limit. Though this value changes according to the refractive index profile, a lower limit value is usually about 1.1 in the optical fiber with a suitable characteristic as an amplification fiber.

Since the effective area Aeff contributing to the Raman gain is influenced by both of the signal band and the pump band, an effective gain can be obtained by reducing the effective area Aeff of the pump band without remarkably reducing the effective area Aeff of the signal band. That is, a discrete Raman amplifier can be constituted that the reduction of the nonlinear effect can be achieved and a sufficient Raman gain can be obtained by setting the ratio of the effective areas Aeff equal to or more than 1.2 while maintaining the Raman gain efficiency of equal to or more than 4.

As shown in FIG. 4, a relationship between a ratio of propagation refractive index of the 1550 nanometers to 1450 nanometers is made large, a ratio of the effective areas Aeff of the 1550 nanometers to 1450 nanometers of the amplification fiber becomes large. In this profile, the ratio of the effective area Aeff described above can be made equal to or more than 1.2 by setting the ratio of the propagation refractive index equal to or more than 0.9982.

Figure 5:
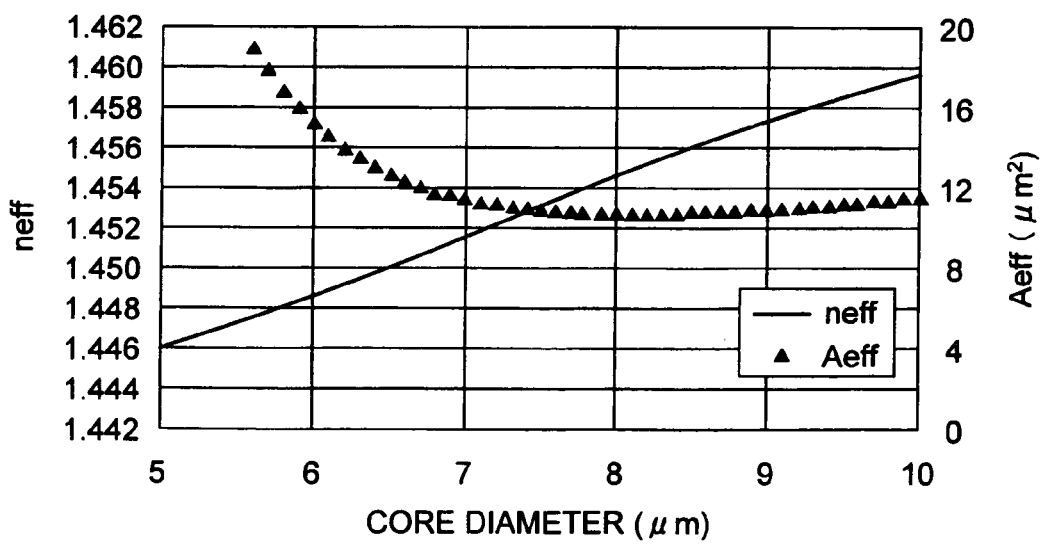
FIG. 5 is a graph of a core diameter dependency of a propagation refractive index (neff) and an effective area.
Figure 6:
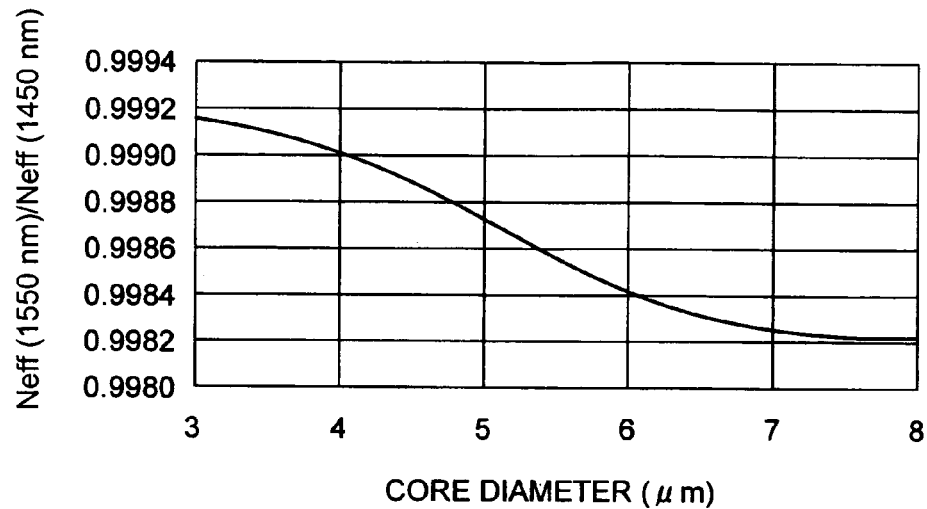
FIG. 6 is a graph of a core diameter dependency of a ratio of propagation refractive index (neff) at 1550 nm to one at 1450 nm.

FIG. 5 shows a core diameter dependency of a propagation refractive index and an effective area. Here, the core diameter indicates a diameter of the second core "b". When the core diameter of an amplification fiber is made small, the propagation refractive index becomes small, and when the propagation refractive index is coincident with the refractive index of the cladding, the core becomes impossible to confine light, and thus the amplification fiber does not function as an optical fiber. In general, when the propagation refractive index becomes small, as shown in FIG. 5, the effective area Aeff becomes large rapidly. Since the propagation refractive index has a wavelength dependency, a difference in effective area Aeff between two wavelengths can be provided. As shown in FIG. 6, generally, a difference in propagation refractive index between two wavelengths becomes smaller according to reduction in core diameter.

Furthermore, FIG. 8 is a table of characteristics of the amplification fiber shown in FIG. 7. A cladding of the optical fibers is substantially made of the silica glass. Amplification fibers "G" to "I" according to the present embodiment are constituted such that their Raman gain efficiencies are equal to or more than 4 (m/W) and their ratios of the nonlinear parameter γ to the Raman gain efficiency are equal to or less than 3. Further, the amplification fibers "G" to "I" are set such that the ratios of the effective area Aeff at the wavelength of 1550 nanometers to the effective area Aeff at the wavelength of 1450 nanometers are equal to or more than 1.2.

Accordingly, the amplification fiber having the refractive index profile shown in FIG. 7 can also reduce the nonlinear phase shift while obtaining a sufficient Raman amplification efficiency similar to the amplification fiber shown in FIG. 2.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical fiber comprising:
a first core region of an α-shaped profile at a center;
a second core region surrounding the first core region in which refractive index is lower than the first core region; and
a cladding surrounding the second core region in which refractive index is lower than the first core region and higher than the second core region,
wherein a relative refractive index difference of the first core region with a cladding region $\Delta 1$ is not less than 2.4% and not more than 2.8%,
a Raman gain efficiency with a pump power at 1450 nanometers of equal to or more than 4 m/W, and
a ratio of a nonlinear parameter γ at a wavelength of 1550 nanometers to the Raman gain efficiency with a pump power of 1450 nanometers of equal to or less than 3.

2. The optical fiber according to claim 1, wherein a ratio of the effective area Aeff at the wavelength of 1550 nanometers to the effective area Aeff at the wavelength of 1450 nanometers is equal to or more than 1.2.

3. The optical fiber according to claim 1, wherein
the effective area Aeff at the wavelength of 1450 nanometers is equal to or less than 9.0 $\mu m^2$, and
the effective area Aeff at the wavelength of 1550 nanometers is equal to or more than 11.0 $\mu m^2$.

4. The optical fiber according to claim 2, wherein
the effective area at the wavelength of 1450 nanometers is equal to or less than 9.0 $\mu m^2$, and
the effective area Aeff at the wavelength of 1550 nanometers is equal to or more than 11.0 $\mu m^2$.

5. The optical fiber according to claim 1, wherein
the Raman gain efficiency with a pump power of 1450 nanometers is equal to or more than 6.5 m/W, and
the value of the nonlinear parameter γ at the wavelength of 1550 nanometers is equal to or less than 20 1/W/km.

6. An optical fiber module comprising an optical fiber, the optical fiber comprising:
a first core region of an α-shaped profile at a center;
a second core region surrounding the first core region in which refractive index is lower than the first core region; and
a cladding surrounding the second core region in which refractive index is lower than the first core region and higher than the second core region,
wherein a relative refractive index difference of the first core region with a cladding region A1 is not less than 2.4% and not more than 2.8%,
a Raman gain efficiency with a pump power at 1450 nanometers of equal to or more than 4 m/W, and
a ratio of a nonlinear parameter γ at a wavelength of 1550 nanometers to the Raman gain efficiency with a pump power of 1450 nanometers of equal to or less than 3.

7. The optical fiber module according to claim 6, wherein the optical fiber having
a ratio of the effective area Aeff at the wavelength of 1550 nanometers to the effective area Aeff at the wavelength of 1450 nanometers of equal to or more than 1.2.

8. The optical fiber module according to claim 6, wherein the optical fiber having
the effective area Aeff at the wavelength of 1450 nanometers of equal to or less than 9.0 $\mu m^2$, and
the effective area Aeff at the wavelength of 1550 nanometers of equal to or more than 11.0 $\mu m^2$.

9. The optical fiber module according to claim 7, wherein the optical fiber having
the effective area Aeff at the wavelength of 1450 nanometers of equal to or less than 9.0 $\mu m^2$, and
the effective area at the wavelength of 1550 nanometers of equal to or more than 11.0 $\mu m^2$.

10. The optical fiber module according to claim 6, wherein the optical fiber having
the Raman gain efficiency with a pump power of 1450 nanometers of equal to or more than 6.5 m/W, and
the value of the nonlinear parameter γ at the wavelength of 1550 nanometers of equal to or less than 20 1/W/km.

11. The optical fiber module according to claim 6, further comprising a converting unit that is provided between a single mode fiber, which is connected to the optical fiber, with a mode field diameter of about 10 micrometers or more and at least one of an input terminal and an output terminal of the optical fiber, for converting the mode field diameter.

12. The optical fiber module according to claim 7, comprising a converting unit that is provided between a single mode fiber, which is connected to the optical fiber, with a mode field diameter of about 10 micrometers or more and at least one of an input terminal and an output terminal of the optical fiber, for converting the mode field diameter.

13. A Raman amplifier comprising an optical fiber comprising:
a first core region of an α-shaped profile at a center;
a second core region surrounding the first core region in which refractive index is lower than the first core region; and
a cladding surrounding the second core region in which refractive index is lower than the first core region and higher than the second core region,
wherein a relative refractive index difference of the first core region with a cladding region (1 is not less than 2.4% and not more than 2.8%,
a Raman gain efficiency with a pump power at 1450 nanometers of equal to or more than 4 m/W, and
a ratio of a nonlinear parameter (at a wavelength of 1550 nanometers to the Raman gain efficiency with a pump power of 1450 nanometers of equal to or less than 3.

14. The Raman amplifier according to claim 13, wherein a ratio of the effective area at the wavelength of 1550 nanometers of the optical fiber to the effective area Aeff at the wavelength of 1450 nanometers of the optical fiber is equal to or more than 1.2.

15. The Raman amplifier according to claim 13, wherein
the effective area Aeff at the wavelength of 1450 nanometers of the optical fiber is equal to or less than 9.0 $\mu m^2$, and
the effective area Aeff at the wavelength of 1550 nanometers of the optical fiber is equal to or more than 11.0 $\mu m^2$.

16. The Raman amplifier according to claim 14, wherein
the effective area Aeff at the wavelength of 1450 nanometers of the optical fiber is equal to or less than 9.0 $\mu m^2$, and
the effective area Aeff at the wavelength of 1550 nanometers of the optical fiber is equal to or more than 11.0 $\mu m^2$.

17. The Raman amplifier according to claim 13, wherein
the Raman gain efficiency with a pump power of 1450 nanometers of the optical fiber is equal to or more than 6.5 m/W, and the value of the nonlinear parameter γ at the wavelength of 1550 nanometers of the optical fiber is equal to or less than 20 1/W/km.

18. The Raman amplifier according to claim 13, comprising an optical fiber module, the optical fiber module having a converting unit that is provided between a single mode fiber, which is connected to the optical fiber, with a mode field diameter of about 10 micrometers or more and at least one of an input terminal and an output terminal of the optical fiber, for converting the mode field diameter.

19. The Raman amplifier according to claim 14, comprising an optical fiber module, the optical fiber module having a converting unit that is provided between a single mode fiber, which is connected to the optical fiber, with a mode field diameter of about 10 micrometers or more and at least one of an input terminal and an output terminal of the optical fiber, for converting the mode field diameter.

20. The optical fiber according to claim 1, wherein
the cladding region is substantially made of pure silica glass or fluorine doped silica glass, and a relative refractive index difference of the second core region with the cladding region $\Delta 2$ is not more than −0.25%.

21. The optical fiber according to claim 1, wherein the cladding region is substantially made of pure silica glass or fluorine doped silica glass, a ratio of a propagation refractive index at wavelengths of 1550 nanometers to a propagation refractive index at wavelengths of 1450 nanometers is determined from a relationship between the ratio of the propagation refractive index at wavelengths of 1550 nanometers to the propagation refractive index at wavelengths of 1450 nanometers and a ratio of an effective area Aeff at wavelengths of 1550 nanometers to an effective area Aeff at wavelengths of 1450 nanometers, and a second core diameter is determined from a relationship between the second core diameter and the ratio of the propagation refractive index at wavelengths of 1550 nanometers to the propagation refractive index at wavelengths of 1450 nanometers.

\* \* \* \* \*